United States Patent
Lavi et al.

(10) Patent No.: US 9,275,311 B2
(45) Date of Patent: *Mar. 1, 2016

(54) EFFICIENT IMAGE MATCHING FOR LARGE SETS OF IMAGES

(71) Applicant: PicScout (Israel) LTD., Herzliya Pituach (IL)

(72) Inventors: Uri Lavi, Netanya (IL); Eli Goz, Herzlya (IL); Gregory Begelman, Rishon Lezion (IL)

(73) Assignee: PicScout (Israel) LTD., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,689

(22) Filed: Nov. 11, 2014

(65) Prior Publication Data

US 2015/0071552 A1    Mar. 12, 2015

Related U.S. Application Data

(63) Continuation of application No. 14/141,295, filed on Dec. 26, 2013, now Pat. No. 8,885,984.

(30) Foreign Application Priority Data

May 7, 2013    (IL) .......................... 226219

(51) Int. Cl.
  *G06K 9/60* (2006.01)
  *G06K 9/68* (2006.01)
  *G06K 9/46* (2006.01)

(52) U.S. Cl.
  CPC ............ *G06K 9/6857* (2013.01); *G06K 9/4671* (2013.01); *G06K 2209/29* (2013.01)

(58) Field of Classification Search
  None
  See application file for complete search history.

(56) References Cited

U.S. PATENT DOCUMENTS

| | | | |
|---|---|---|---|
| 6,360,020 B1 | 3/2002 | Panis | |
| 6,711,293 B1 | 3/2004 | Lowe | |
| 8,352,494 B1 | 1/2013 | Badoiu | |
| 8,488,883 B2 | 7/2013 | Gutelzon et al. | |
| 8,782,077 B1 * | 7/2014 | Rowley et al. | 707/769 |
| 2003/0202692 A1 | 10/2003 | Obrador | |

(Continued)

FOREIGN PATENT DOCUMENTS

WO    2009065151 A2    5/2009

OTHER PUBLICATIONS

Lowe, David G., Distinctive Image Features from Scale-Invariant Keypoints, International Journal of Computer Vision, Jan. 5, 2004, 28 pages.

Nister, David and Stewenius, Henrik, Scalable Recognition with a Vocabulary Tree, Center for Visualization and Vitual Environments, Department of Computer Science, University of Kentucky, 2006, 8 pages.

(Continued)

*Primary Examiner* — Jason Heidemann
(74) *Attorney, Agent, or Firm* — Perkins Coie LLP

(57) ABSTRACT

A system and method to detect similarities between images. The system and method allow comparisons between a query image and one or more catalog images in a manner that is resilient to scanning, scaling, rotating, cropping and other distortions of the query image. The system includes an image processing module that determines and/or calculates principle features of a catalog image and constructs a feature vector using one or more of the principle features. The system also includes a matching module that matches a query image to one or more catalog images. The system finds matches based on a distance measure of features present in the query image and features present in the catalog images.

14 Claims, 13 Drawing Sheets

(56) References Cited

U.S. PATENT DOCUMENTS

| | | |
|---|---|---|
| 2006/0251292 A1 | 11/2006 | Gokturk et al. |
| 2008/0162474 A1 | 7/2008 | Thong et al. |
| 2008/0177764 A1 | 7/2008 | Kise et al. |
| 2009/0297050 A1* | 12/2009 | Li et al. .................. 382/225 |
| 2010/0008589 A1* | 1/2010 | Bober et al. ............... 382/218 |
| 2010/0027895 A1 | 2/2010 | Noguchi et al. |
| 2010/0046842 A1 | 2/2010 | Conwell |
| 2010/0124354 A1 | 5/2010 | More |
| 2010/0185615 A1* | 7/2010 | Monga .................... 707/736 |
| 2011/0305399 A1 | 12/2011 | Zitnick et al. |
| 2012/0051628 A1 | 3/2012 | Noguchi et al. |
| 2012/0155778 A1 | 6/2012 | Buchmueller et al. |
| 2012/0314959 A1 | 12/2012 | White et al. |
| 2013/0039584 A1 | 2/2013 | Harmanci et al. |
| 2013/0077873 A1 | 3/2013 | Bar Hillel et al. |
| 2014/0067806 A1 | 3/2014 | Chandrasekhar |
| 2014/0067870 A1 | 3/2014 | Chandrasekhar |

OTHER PUBLICATIONS

Non-Final Office Action for U.S. Appl. No. 14/141,295, Mail Date Mar. 21, 2014, 17 pages.

Notice of Allowance for U.S. Appl. No. 14/141,295, Mail Date Jul. 18, 2014, 18 pages.

Taubin, Gabriel, Estimation of planar curves, surfaces, and nonplanar space curves defined by implicit equations with applications to edge and range, Pattern Analysis and Machine Intelligence, IEEE Transaction, Nov. 1991, vol. 13, Issue 11, pp. 1115-1138.

Van Krevelo, Marc, Computational Geometry, Lecture 6: Kd-trees and range trees, University of Florida, Fall 2009, 59 pages.

Office Action for counterpart IL Application No. 226219, mailed Apr. 13, 2015 (4 pages, with translation).

International Search Report and Written Opinion for counterpart PCT Application No. PCT/IL2014/050409, mailed Aug. 22, 2014 (12 pages).

* cited by examiner

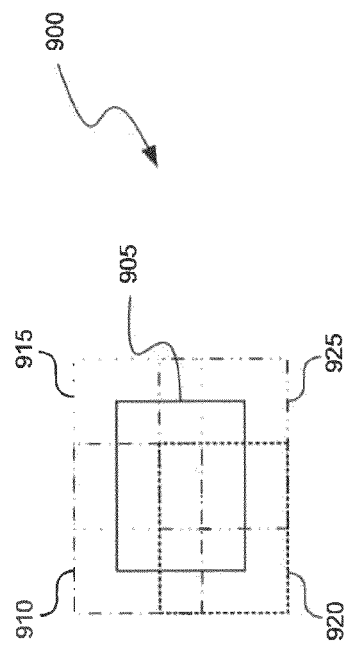
FIG. 9A
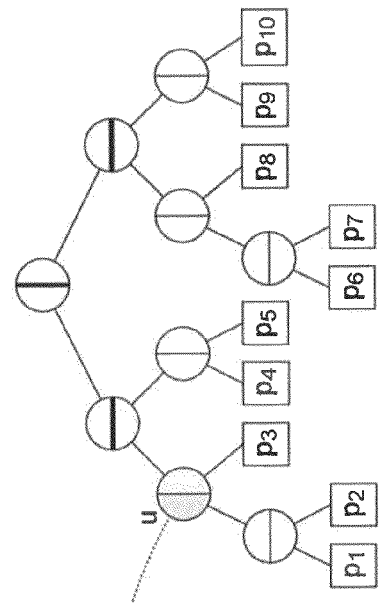
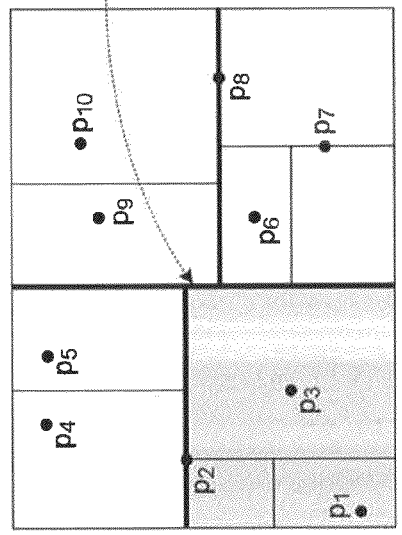
FIG. 9B

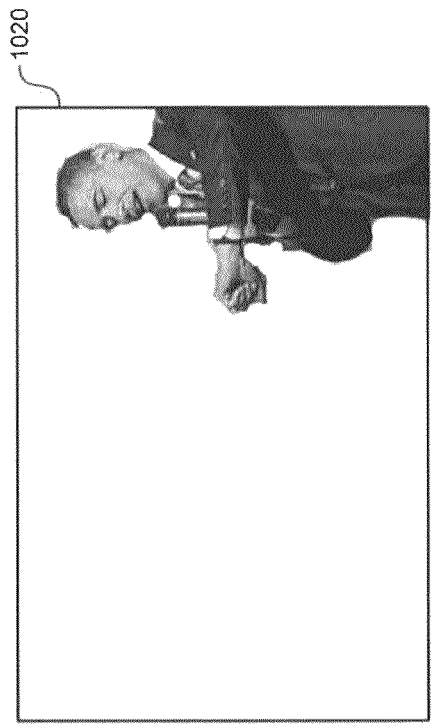
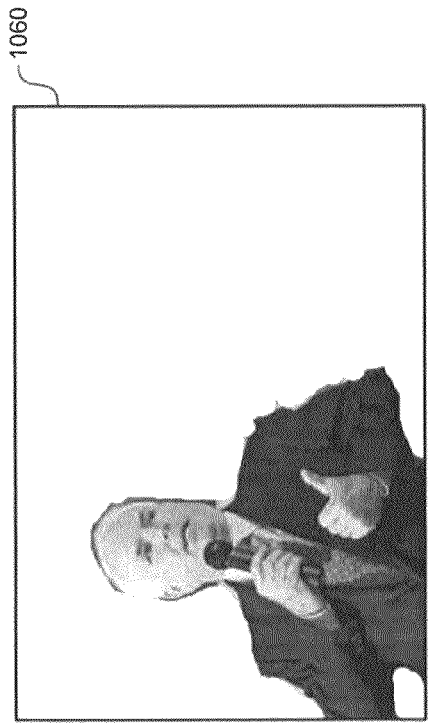
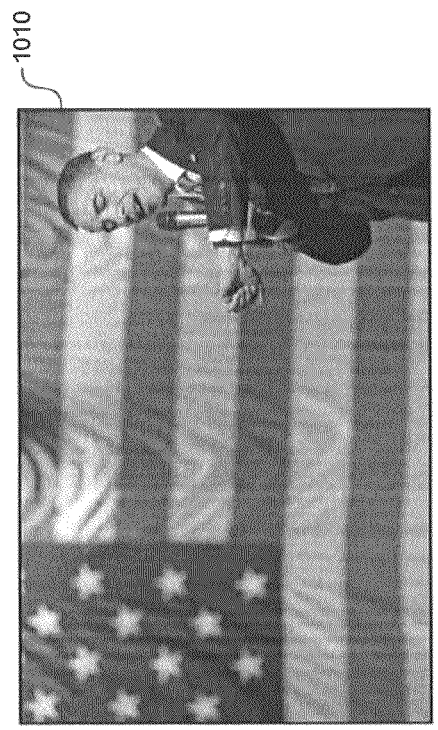
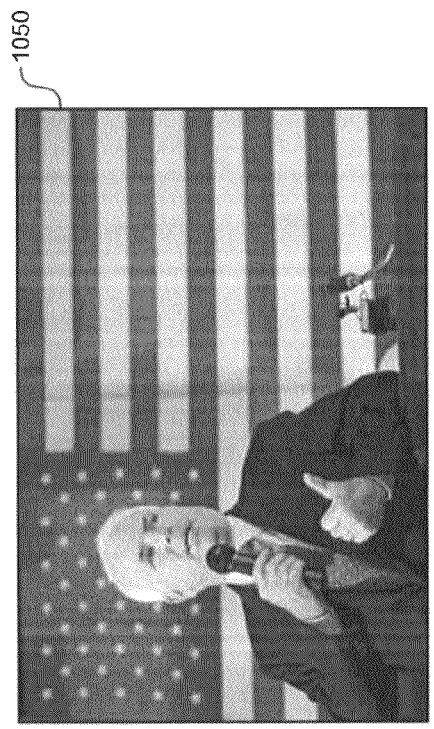
FIG. 10

EFFICIENT IMAGE MATCHING FOR LARGE SETS OF IMAGES

CROSS-REFERENCE TO RELATED APPLICATIONS

This application is a continuation of U.S. patent application Ser. No. 14/141,295, now U.S. Pat. No. 8,885,984, entitled "EFFICIENT IMAGE MATCHING FOR LARGE SETS OF IMAGES," filed Dec. 26, 2013, which claims priority to Israel Patent Application No. 226219, entitled "EFFICIENT IMAGE MATCHING FOR LARGE SETS OF IMAGES," filed May 7, 2013, each of which are incorporated herein by reference in their entireties. This application is related to commonly assigned U.S. patent application Ser. No. 12/978,687, now granted U.S. Pat. No. 8,488,883, entitled "ROBUST AND EFFICIENT IMAGE IDENTIFICATION," filed Dec. 27, 2010, which is incorporated herein by reference in its entirety.

BACKGROUND

Image rights holders may post images in professional image banks, where they can be viewed and licensed by others. Professional image banks will often utilize technologies to mark digital images so that their proper use can be monitored and charged for, and their unauthorized use identified. For example, image banks may watermark an image by embedding special codes directly into the image. By searching for images with watermarks, the professional image bank can identify uses of images and assess whether such uses were authorized or unauthorized by the rights holder.

While image protection schemes are typically very effective when images are copied and used directly, many protection schemes can be defeated if changes are made to the image. For example, it can be difficult to detect images that have been cropped, resized or partially modified. In addition, it may be very difficult for typical protection schemes to identify unauthorized digital images that are scanned copies of printed originals. For example, images provided by newspapers or magazines may be scanned and then posted on the Internet in a manner that makes them very difficult to detect.

Some existing image comparison systems may match an image for different versions of the same image. However these systems typically have limited effectiveness identifying redigitized versions of images. These image comparison systems are particularly ineffective if the image has been cropped, flipped, rotated, the color balance has been changed and/or if other distortions have been applied.

BRIEF DESCRIPTION OF THE DRAWINGS

The patent or application file contains at least one drawing executed in color. Copies of this patent or patent application publication with color drawing(s) will be provided by the Patent Office upon request and payment of the necessary fee.

FIGS. 9A and 9B illustrate various data constructs used by the indexing, matching, and comparison system.

FIG. 10 depicts representative images that are analyzed by a filtering module to remove the characterization of certain background features of the images that are not beneficial for purposes of image matching.

DETAILED DESCRIPTION

Figure 1:
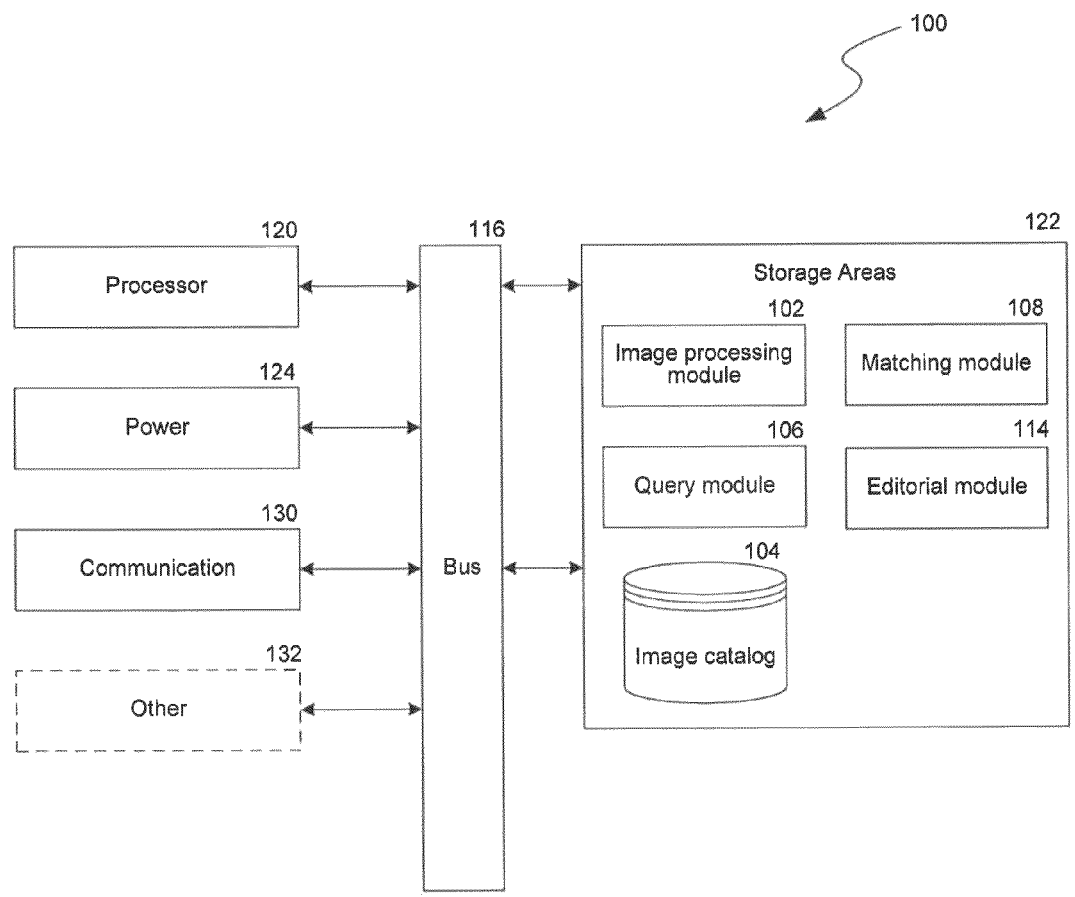
FIG. 1 is a block diagram of an image indexing, matching, and comparison system.

A system and methods to detect similarities between images is disclosed herein. The system and methods allow comparisons between a query image and one or more catalog images in a manner that is resilient to scanning, scaling, rotating, cropping and other distortions of the query image. The system includes an image processing module that identifies principle features of a catalog image and constructs a feature vector using one or more of the principle features. For each principle feature, a vector made up of measures of the surrounding features is added as patch information to the principle feature. The resulting vector is multi-dimensional. For example, the system may construct a k-dimensional vector that describes intensities of points in a region adjacent to each principle feature that is identified in a catalog image.

The system also includes a matching module that matches a query image to one or more catalog images. The system finds matches based on a distance measure of features present in the query image and features present in the catalog images. Based on the distance measure, the system produces a list of candidate catalog images that are associated with the query image.

The system may also include a filtering module that applies one or more transformations and/or correlations (e.g., Hamming distance, etc.) to select between candidate images, finding either one or more best candidate images or no candidate at all, if the closest distance is still above a preset threshold. In some embodiments, the filtering module may detect one or more cropped query images of catalog images. In the case of a cropped query image, the query image may be a mere subset or a superset of the catalog image. Such a circumstance is allowed for by using an unordered set of descriptors to describe each image. The system performs the image comparison based on a given feature and tests whether its surroundings are correct.

In principle the disclosed methods may lead to large numbers of searches for each query image, and as will be discussed below, certain embodiments cater for this issue. Is some circumstances, however, the number of searches may be reduced without having a detrimental impact on the image comparison. For example, even though a feature vector may have 126 points, the system may avoid checking all the points, but instead may identify and check a selection of the strongest points. A variety of techniques are disclosed herein for identifying the strongest points to check.

In practice, the disclosed system may be used to compare a catalog of images, e.g., an image bank, with images appearing on the World Wide Web that may be cropped, scaled, scanned or otherwise include distortions. The system detects matches with query images and provides an indication of matched images for additional review, processing, or use by a system operator or other applications. For example, an application may use the system to automatically assess whether the query images are authorized or unauthorized uses of the images in the catalog of images.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable System

FIG. 1 and the following discussion provide a brief, general description of a suitable environment in which the technology may be implemented. Although not required, aspects of the technology are described in the general context of computer-executable instructions, such as routines executed by a general-purpose computer. Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network. In a distributed computing environment, program modules may be located in both local and remote memory storage devices.

Aspects of the technology may be stored or distributed on computer-readable media, including magnetically or optically readable computer disks (e.g., microcode on semiconductor memory, nanotechnology memory, organic or optical memory, and/or other portable data storage media). Indeed, computer-implemented instructions, data structures, screen displays, and other data under aspects of the technology may be distributed over the Internet or over other public or private networks (including wireless networks).

FIG. 1 is a block diagram illustrating example modules of an image indexing, matching, and comparison system 100. The system 100 includes an image processing module 102 that extracts features from one or more images to create a set of digital descriptors for each image. The image processing module stores images and/or digital descriptors for each image in an image catalog 104. A query module 106 searches for images located, for example, on a website accessible via the Internet. Query images located by the query module 106 may by analyzed by the image processing module 102 to create a set of digital descriptors for each query image. A matching module 108 searches the image catalog 104 for catalog images having a predetermined number of descriptors at least similar to descriptors for each of the query images. As will be described in additional detail herein, the matching module applies a two-stage analysis to find and narrow candidate catalog images that may match a particular query image. In some embodiments, an editorial module 114 can be configured to filter out common backgrounds, background objects (e.g., logos), and/or other objects that are of limited interest in an image. For example, the editorial module may filter out well-known objects, landmarks, posters, signs, flags, etc.

The system 100 may execute modules and/or the flow or processing of information or data between modules using one or more processors 120 in communication with a storage area 122. Storage area may include volatile or non-volatile memory, such as ROM or RAM, as well as magnetic or optical storage devices, such as hard disk drives or flash shortage drives. The storage area contains instructions or data necessary to implement the modules, and is accessed by the processor 120 via a bus 116. That is, the memory 122 contains data structures or other files or applications to build a catalog of images and match one or more queried images to the images in the catalog.

The system 100 receives energy via a power module 124. Additionally, the system 100 receives or transmits information or data to remote computing devices (e.g. other computers connected to the Internet or other public or private network) via a communication module 130. The communication module 130 may be any wired and/or wireless module capable of communicating data to and from the system 100. Examples include a wireless radio frequency transmitter, infrared transmitter, or hard-wired cable, such as an Ethernet and/or USB cable. The system 100 may include other additional modules 132 not explicitly described herein, such as additional microprocessor modules, communication modules, interface modules, etc.

Figure 2:
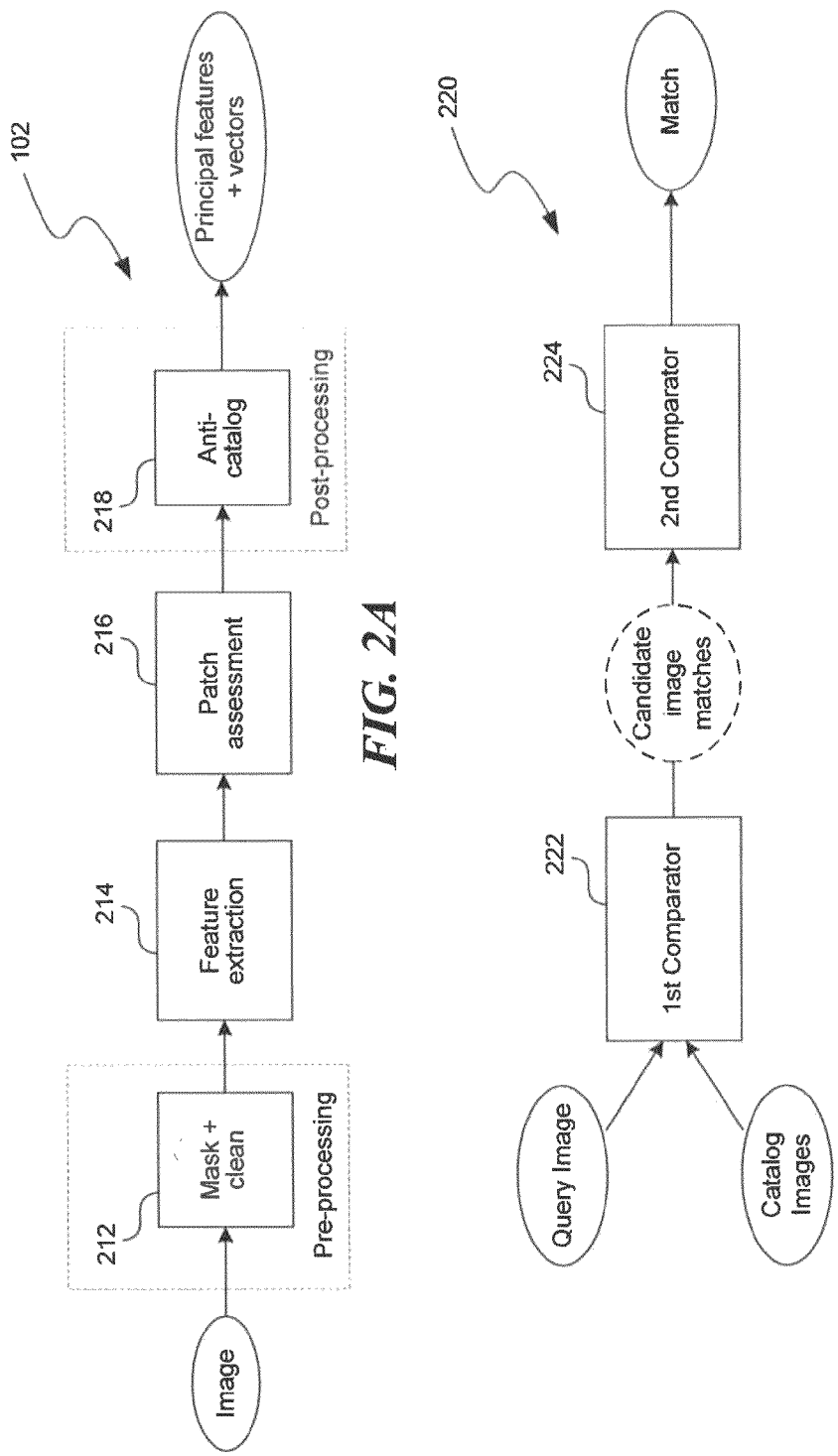
FIG. 2A is a block diagram of an image processing module for characterizing an image using principal features.
FIG. 2B is a block diagram of a two-stage matching module for matching a query image against a catalog of images.

FIG. 2A is a block diagram of the image processing module 102 of a system for characterizing an image to allow matching a query image against a catalog of images. The image processing module 102 deconstructs an image into a series of principle features. The image processing module further characterizes each principal feature based on characteristics of a region around the principle features.

Before characterization of principle features in an image, one or more pre-processing steps may be applied to the image. For example, a mask and clean module 212 masks out irrelevant parts of an image such as text regions, masks in areas of particular interest of the image such as skin tone regions, and cleans out noise in the image such as may be introduced from scanning. The pre-processing performed by the mask and clean module 212 is not required for all images. For example, masking may not be required for previously digitized clean images such as are generally contained in an on-line editorial catalog. Rather it is generally used for the query images that are being analyzed by the system. As will be discussed in additional detail herein, the masking module 212 masks out text areas from the image by distinguishing between a Laplacian distribution that characterizes image areas and a sparse distribution that characterizes text areas.

A feature extraction module 214 extracts principle features from the query image. As will be explained herein, features are first extracted from the image. Depending on the size and complexity of the image, the feature extraction module 214 may identify thousands of feature points in an image. For economic and performance reasons, however, it is typically beneficial for the system to only retain a set of the most significant features (the "principle features"). In some embodiments, the feature extraction module 214 may obtain principle features by reducing the extracted features to a set of a predetermined upperbound size. The reduction of features is achieved by identifying the strongest features in the image. In some embodiments, the strongest features in the image are detected, from all levels and octaves which have a wide distribution over the image, by identifying large gradients in a Laplace transform of the image. A greedy algorithm may be applied by the system to take into consideration the intensity of each feature and their spatial distance in the identification of the principle features.

A patch assessment module 216 takes each of the principle features and establishes relative distances between the given principle feature and surrounding features such as surrounding intensities. For each principle feature, a vector made up of measures of the surrounding features, such as normalized intensities or other measures of the surrounding features, is then added as patch information to the principle feature. The resulting vector is multi-dimensional. FIG. 9A is a graphical representation of the regions used by the patch assessment module 216 to characterize an area 900 around a principle feature. The patch assessment module 216 divides the area around the principle feature into five overlapping regions 905, 910, 915, 920, and 925. Region 905 is centered on the principle feature. Regions 910-925 overlap with, and collectively cover the entirety of, region 905. The patch assessment module 216 characterizes the features contained in each region as a vector that is projected into a 4-dimensional space. The vectors for all five regions are then concatenated by the patch assessment module into a single 20-vector descriptor that characterizes the associated principle feature. One skilled in the art will be appreciated that the number, size, and shape of the regions may vary from what is depicted in FIG. 9A.

The patch assessment thereby characterizes the query image based on some or all principle feature points and relative intensity or other characteristics. The vector description is independent of any absolute size, coloring, scaling, or cropping of the query image. An advantage of characterizing an image in this fashion is that the image characterization can be used to search for different versions of the same image despite color distortion, noise, stretching, slight rotation, flip, cropping and compositing with another image, provided that both the query and the catalog images are described in the same way.

After characterization of principle features in an image, one or more post-processing steps may be applied to the image. As an example, an anti-catalog module 218 may remove principle features associated with unwanted objects in an image that are of limited benefit when characterizing the image. Examples of unwanted objects that the system may seek to exclude include different corporate logos in the background of an image, well-known objects in the background (e.g., the Eiffel tower), movies or game posters in the background, common textures and geometric shapes in the background, etc. As will be described in additional detail herein, in order to avoid characterizing those portions of an image that contain unwanted objects, the system 100 uses a catalog of images of unwanted objects ("an anti-catalog") in order to detect unwanted objects in an image. Once detected, the system may remove those vectors that describe the principal features associated with the unwanted objects from the image characterization. The image characterization is then saved in the catalog of images with those principle feature points that matched unwanted objects removed. The post-processing performed by the anti-catalog module 218 is optional, and may not be performed on all images processed by the system FIG. 2B is a block diagram of the two-stage matching module 108 of the system for matching a query image against a catalog of images. A first comparator 222 compares principle features and associated surrounding patch description of a query image with principle features and associated surrounding patch descriptions of catalog images to find candidate matches. The first comparator uses distance measures to perform the comparison. For each principle feature, the first comparator 222 tests the vectors of the patch information of the query image against the vectors of each catalog image. The closeness may be measured, for example, by calculating a Euclidian distance between the selected vectors. The proximity of descriptors can also be efficiently estimated using approximate nearest neighbors (ANN) approaches, such as using a k-d tree. If the patch information of the query image and a particular catalog image against which the query image is being compared look the same for several principle features, the corresponding catalog image is a candidate match and is added to a candidate set. The number of principal features that are required to match is set by the system. The comparison performed by the first comparator is discussed in greater detail herein.

A second comparator 224 carries out a second comparison between the query image and each of the candidate matches to find a nearest match. The second comparison involves an analysis that determines which candidates have the highest correspondence with the catalog images. For example, the second comparator may assess the closeness of two images based on the transformation needed between the two images. Provided that the transformation between the two images being compared is below a preset threshold and geometrically valid, the analyzed candidate image is regarded as a match.

The disclosed matching module 220 works equally well where the query image is a cropped version of an image, that is to say a subset of an image found in the catalog. In general the parts of images remaining after cropping are usually the interesting parts of images so it would be expected that many of the principle features and patch information in the query image will have been preserved as part of the cropping process. Of course, some of the features of a cropped image will be missing. In this case the first comparator 222 may compare all patch information of a given principle feature of the query image with just a subset of the corresponding information of the catalog image, so that nearness between the two images is reasonably assessed despite certain features being missing.

In general, the system pre-processes catalog images so that the characterization of each image is stored in associated with the image in the catalog. In contrast, the system typically processes query images at the time of the search. Query images may be images initially in electronic form, say on the World Wide Web, or may be images that have been found in a printed publication and which are scanned before being processed by the system.

The system enables the detection of a copied image, even if the query image is derived from the original image. The query image may include a subset or a superset of the catalog image. The query image may have also been through changes such as color distortion, noise, stretching, slight rotation, flip, cropping and compositing with another image. Such distortions are often referred to as distortions in the image plane.

Image Analysis

Figure 3:
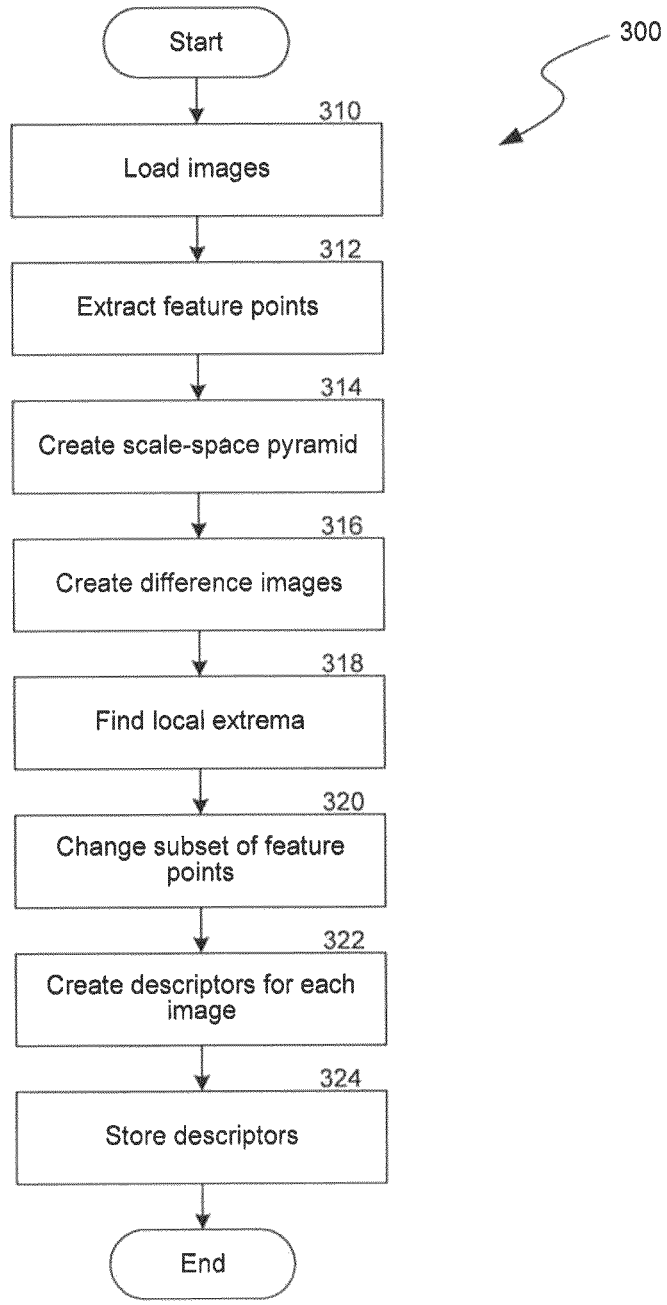
FIG. 3 is a flow chart of a process to extract feature points of an image and create descriptors of the image.

FIG. 3 is a flow chart of a process 300 that is implemented by the image processing module 102 in the system 100. In block 310, the system 100 loads one or more images to be analyzed, for example, as catalog images and/or as query images. In block 312, the system 100 extracts N feature points from the loaded images. For each of the N feature points, a K-dimensional vector is created as its descriptor. In some embodiments the number N is 256, while in other embodiments the number N can be any suitable number of feature points. The system 100 is configured to extract feature points that are easy to extract and likely to remain stable over transformations. The system identifies feature points by, for example, calculating extrema of a Difference Of Gaussians (DOG) function in image scale space. Low contrast candidate points in the image and edge response points along an edge of the image are discarded. These steps ensure that the feature points are more stable and robust.

Before feature extraction can be performed on query and/or catalog images, the image processing module 102 is trained using a set of training examples. Initially a principle component analysis (PCA) is performed to find the basis for highly dimensional input vectors that represents the most important information encompassed by these vectors. Expressed a different way, highly dimensional input vectors are identified by taking high-dimensional data and using the dependencies between the variables to represent the data in a more tractable, lower-dimensional form, without losing too much information. In one example, a patch of 100*100 is used such that a sample vector to be projected is 10,000 elements long.

Performing PCA directly on the covariance matrix of the samples can be computationally difficult. In order to avoid such computation and still optimize the PCA, one may proceed as follows:

Let T be a matrix of preprocessed training examples, where each row contains one mean-subtracted image.

The covariance matrix can then be computed as $S=T^T T$ and the eigenvector decomposition of S is given by $Sv_i = T^T T v_i = \lambda_i v_i$.

However $T^T T$ is a large matrix, so instead an Eigen value decomposition of $TT^T u_i = \lambda_i T^T u_i$ can be taken. Pre-multiplying both sides of the equation with $T^T$, results in $T^T T T^T u_i = \lambda_i T^T u_i$, meaning that, if $u_i$ is an eigenvector of $TT^T$, then $v_i = T^T u_i$ is an eigenvector of S. If there is, for example, a training set of 200 images of 100×100 pixels, the matrix $TT^T$ is a 200×200 matrix, which may be much more manageable than a 10000×10000 covariance matrix.

In block 314, the system 100 creates a scale-space pyramid comprising a series of blurred level and scaled octave versions of the image. The blurring may be performed using, for example, a Gaussian filter. In block 316, the system 100 creates Difference or Laplacian images. For each octave and level of the image from block 314, the system 100 can create a Laplacian image, Difference of Gaussians image, or approximation thereof.

In block 318, the system 100 locates local extrema in each image to find feature points. The system determines local maxima/minima in the Difference of Gaussians or Laplacian image of the scale-space pyramid that are above a predetermined intensity. The system may determine the local maxima/minima to sub-pixel accuracy. The local maxima identified in such a fashion represent what may be termed, for example, blobs in the image at a certain scale found in each image after it has been distorted in block 314.

In block 320, the system 100 selects a subset of the feature points. To improve computability, the system 100 reduces the number of feature points. The system 100 selects the strongest feature points from all levels and octaves (represented by a Difference of Gaussians or Laplacian analysis) which have a wide distribution over the image. The strongest feature points in an image may be found, for example, using a greedy algorithm that takes into consideration a feature point's intensity and its spatial distance to other feature points.

Feature points that are considered weak by the analysis are discarded by the system. By reducing the number of feature points, the system is able to more efficiently store a set of feature points that characterize an image. In some embodiments, points found on levels smaller than the level defined by the FIRST_SCALE_SPACE_OCTAVE and the level defined by the FIRST_SCALE_SPACE_LEVEL will be eliminated to remove un-robust, noisy features.

In block 322, the system 100 creates a descriptor for each of the feature points that was selected in block 320. The descriptor is a vector of the normalized intensity values of the patch around the feature point in the relevant octave and level, resized to a constant size and projected onto the K-PCA basis (which has been computed in advance). The size of the initial patch is a by-product of the octave in which it was found. A descriptor is optimized for the distortions likely to be encountered in matching between different copies of the same image, such as distortions that result from illumination, color, noise, blur and some linear transformations. In particular it is noted that the descriptor uses a scale space and a different size of patch according to the octave in which the feature point was found, thus rendering the descriptor invariant to scale.

In block 324, the system 100 stores the descriptors in a data structure that enables efficient search of the closest neighbor in high-dimensional space. For example, the system may store the descriptors in a k-dimensional tree, hashed table, etc., that is associated with each batch of catalog images.

Figure 4:
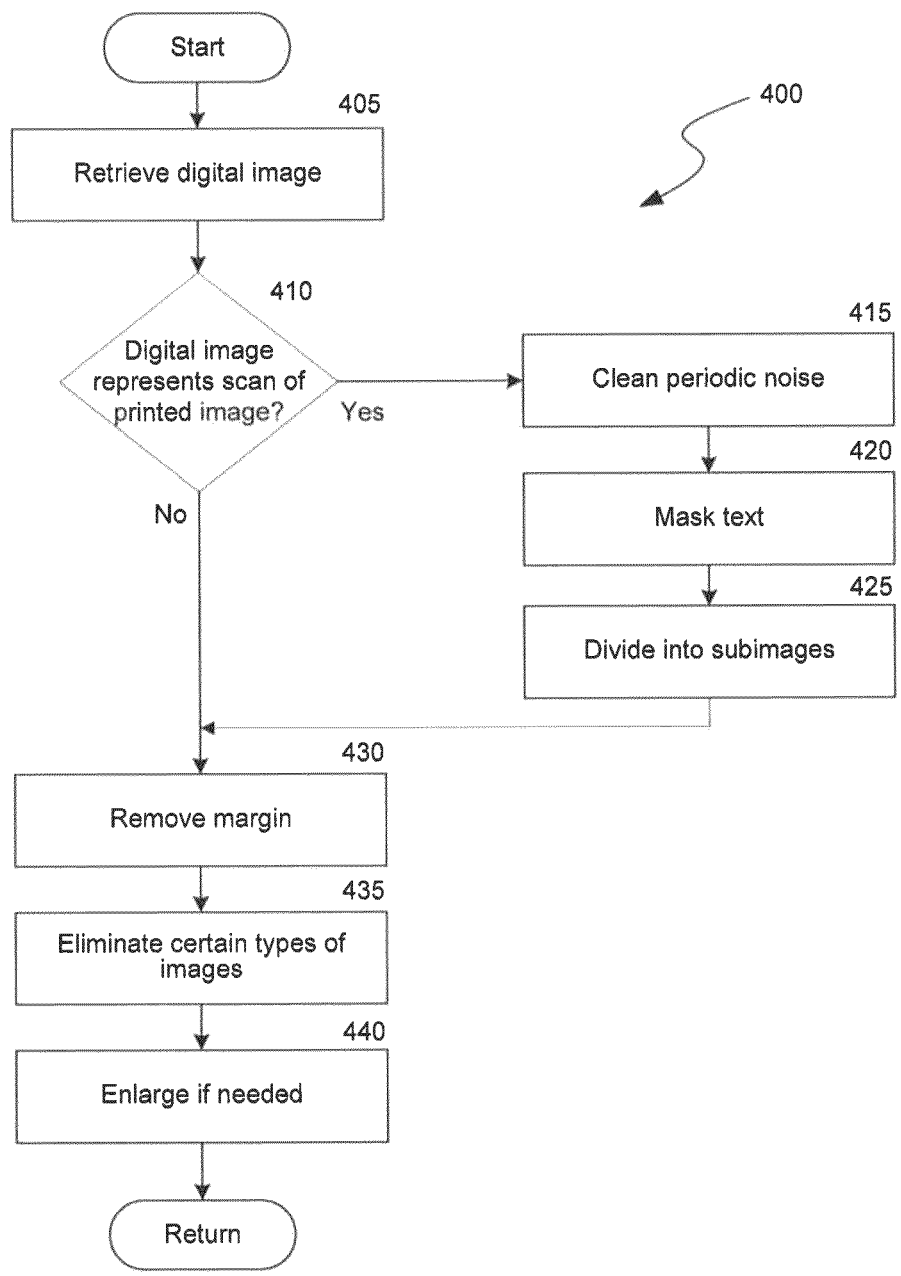
FIG. 4 is a flow chart of a process to prepare digital images for analysis by the system.

FIG. 4 is a flow chart of a process 400 for preparing query images for further analysis by the system 100. A query image may either be an original digital image or a digital image that was generated by scanning a printed image. The process in FIG. 4 may be performed, for example, by the mask and clean module 212 (FIG. 2A).

At a block 405, the system 100 loads a digital query image. At a decision block 410, the system determines whether the image was generated by scanning a printed image (e.g., a scanned image from a magazine, newspaper, book, etc.). Due to the original printing process and the subsequent scanning process, a scanned image may contain periodic noise or other elements that interfere with the comparison process. As a result, query images that are a result of a scanned physical image are pre-processed by the system to mitigate the effects of the noise and/or elements. The image may be identified as a scanned image by metadata associated with the image, by an operator of the system, or by other characteristics of the stored image file (e.g., the detectible presence of certain noise or elements).

If the loaded query image is a scanned image, at a block 415 the system processes the image to reduce periodic noise in the image. The system 100 may reduce periodic noise in the query image using, for example, a fast Fourier transform (FFT). The system 100 creates an FFT of the image and reduces noise contained in the image by processing the FFT to filter or reduce one or more frequency bands contained in the FFT that represent the added noise. The system 100 then performs an inverse FFT on the filtered FFT representation of the query image to obtain a noise-reduced image.

As a block 420, the system 100 processes the image to remove any text that may be contained in the image. Images printed in magazines or newspapers, for example, will often include captions or overlaid text that is captured as part of the scanning process. Because a user of the system is interested in comparing the underlying image, rather than any text that may be superimposed on the image or adjacent to the image, the system may process the image to remove any text. The system 100 processes the image by creating a text vs. image mask and applying the mask to filter the text from the image.

At a block 425, the system 100 processes the scanned image to determine whether the scanned image is a composite of many individual images. Magazines in particular will often fill pages by aggregating images from, for example, a common event. These images are often printed in a manner where they abut each other and therefore present a unified montage to a viewer. If the scanned image consists of many unique images, at block 425 the system divides the montage image into unique sub-images, each of which is treated as a query image by the system.

After processing scanned images, or in the event that the image was determined not to be a scanned image at decision block 410, processing continues to a block 430. At block 430, the system 100 removes a margin from the query image. In removing the margin, the system 100 is configured to recognize a real region of the image (e.g., a region of relevance versus blank edges). For example, if the image is surrounded by a smooth area then the system 100 may check statistics of the image intensities and edges to recognize and remove the margin.

At a block 435 the system 100 eliminates irrelevant images by deleting or de-selecting query images that contain mainly text, logos, and/or blank areas. Rather than compare such images with the database of catalog images, such images can be ignored. Ignoring such images improves processing times by allowing the system to focus on those query images that contain images of interest.

At a block 440, the system 100 may enlarge the query image to better capture meaningful features in the image. For example, if the background of the image is largely uniform, the non-uniform portion of the image may be enlarged since it will most likely include the features of interest. The system repeats the process 400 for each query image that it intends to evaluate against the image catalog.

Figure 5:
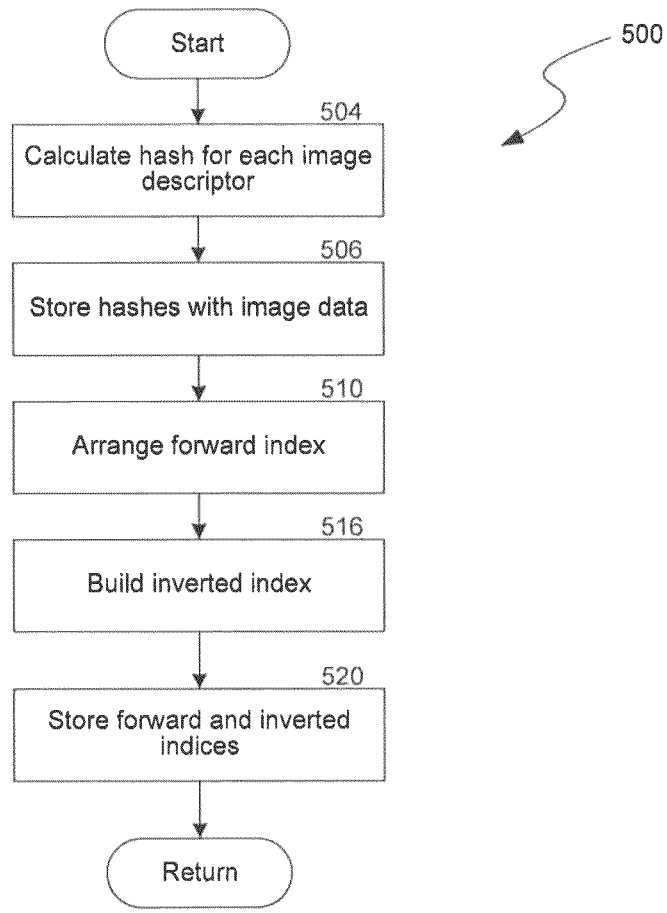
FIG. 5 is a flow chart of a process to generate an index to images in the catalog.

FIG. 5 is a flow chart of a process 500 that is executed by the system 100 to generate an index to images in the catalog. The generated index is sometimes referred to herein as the "near-identical" search index. At a block 504, the system calculates a hash function for each of the descriptors associated with feature points in the catalog images. The use of hashes can significantly reduce search times and necessary storage space because a several-byte descriptor stored in association with a catalog image can be represented by a much shorter hash integer than by the descriptor itself. For example, a descriptor comprising 20 bytes of data can be represented by a much smaller integer value. If, for example, there are 20,000,000 possible descriptors (i.e., 20,000,000 possible different vectors that describe a patch associated with a principle feature), each descriptor can be hashed to an integer value as small as 4 bytes. Although use of a hash of each descriptor may cause more false positives to occur during searching, the speed and storage savings of using the hash more than offsets the additional complexity of the search algorithm that is applied by the system to manage the false positives.

In some embodiments, the system 100 may calculate the hashes of the image descriptors using a k-d tree. The k-d tree may be built using a predetermined number N (e.g., 20,000,000) of descriptors such that each tree leaf contains exactly one descriptor. After the system 100 builds the k-d tree, the tree leaves may be enumerated from 0 to N and loaded to memory for querying. The system 100 may calculate hashes of a descriptor by searching the descriptor's neighbors in a pre-defined radius using the k-d tree. The hash is defined as the leaf number (e.g., a 4-byte integer number). The number of returned tree leaves may be greater than one, depending on the queried descriptor and on the search radius. The k-d tree may divide the high-dimensional features-space in a non-uniform way such that each cell will contain a fixed number of points and enable an efficient search of the nearest k neighbors. A representative k-d tree 950 having leaves $p_1$-$p_{10}$ is depicted in FIG. 9B.

In some embodiments, the system 100 may calculate a different number of hashes for descriptors in catalog images than for descriptors in query images. For example, while each descriptor associated with a catalog image may have one hash, each descriptor associated with a query image may have a different number (e.g., 3) of hashes. Calculating a different number of hashes for the query image enables a more robust search for the query image to be performed against the stored catalog images. After calculation of hashes for each descriptor of a catalog image, at a block 506 the system stores the hashes in association with an identifier for the catalog image.

In block 510, the system 100 constructs for each image an index of hashes comprising the hashes of the descriptors calculated in block 506 for the image. For example, for each image analyzed in block 504, the index constructed in block 506 may include (hash1, hash2, hash3, hash4, . . . hashN). As known to those skilled in the art, using a hash function to create a hash table or index can be used to map or associate an identifier (i.e., a key) of an array element to corresponding data.

In block 516, the system 100 builds an inverted index of hashes such that an index is created for each found hash that contains an image identifier for each image having the hash. For example, if a hash having an identifier hashx is found in an image4, an image7, and an image13, the inverted index would contain the identifier for each image: index of hashx=(image4, image7, image13).

At a block 520, the system 100 stores the forward and inverted indices so that they may be used to easily find and access images in the catalog which match a selected query image.

Query

Figure 6A:
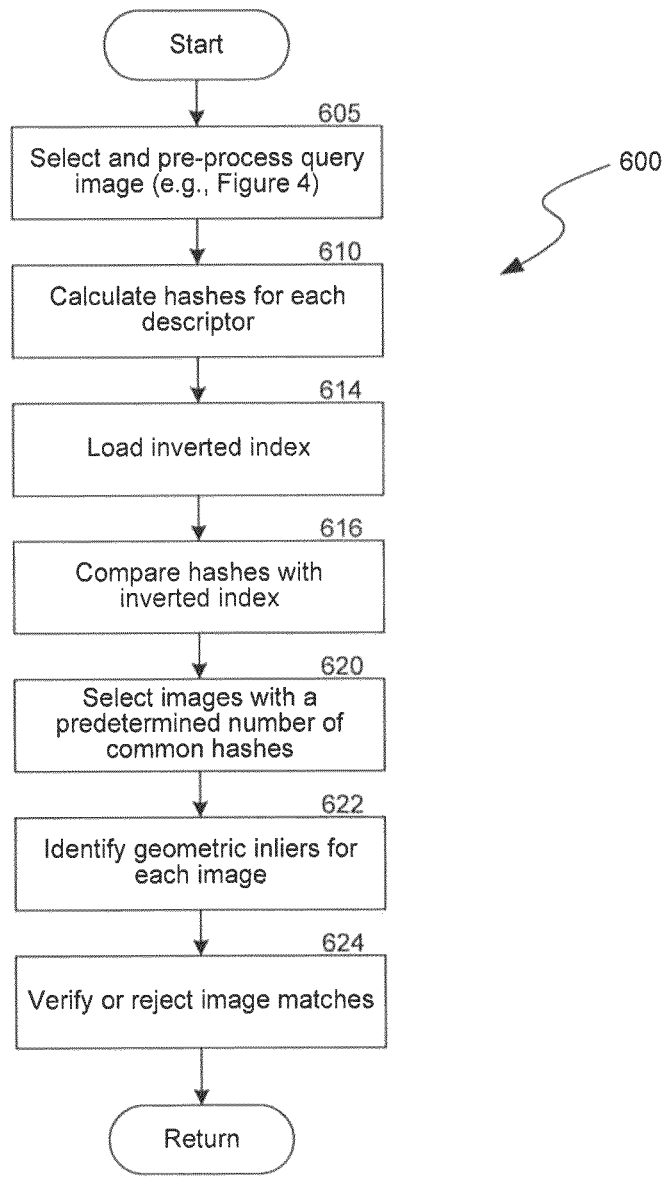
FIG. 6A is a flow chart of a process to compare a query image with the image catalog to identify matching images.

FIG. 6A is a flow chart of a process 600 that is executed by the system 100 to compare a query image with the image catalog to identify matching images. In block 605, the system 100 selects a query image and pre-processes the image, as necessary. As was described with respect to FIG. 4, the system 100 may pre-process the image to clean the image, partition the image, or ignore certain features (e.g., logos, text, common objects, backgrounds, etc.) of the query image that may reduce the likelihood of finding a matching catalog image.

At block 610, the system 100 processes the image to characterize the image using descriptors and to generate hashes for each descriptor. In some embodiments, the system 100 may calculate the hashes using, for example, the process 300 shown in FIG. 3. In other embodiments, the system 100 may use any other suitable hash system and/or function known in the art to calculate the hashes of the query image descriptors.

In block 614, the system 100 loads the inverted index associated with the image catalog. (The inverted index was created at block 516 in FIG. 5.) In block 616, the system 100 compares the hashes associated with the query image (referred as the "probe") with the inverted catalog index. As described above, the inverted index maps each hash representing one or more descriptors to a list of catalog images having the descriptor. For each hash associated with the query image, the system 100 searches the inverted catalog index for catalog images having the particular hash.

In block 620, the system 100 identifies the catalog images that have at least a predetermined number (e.g., 2) of hashes in common with the query image using, for example, a voting routine. The voting routine identifies catalog images that have at least a threshold number (e.g., 3) of features in common. As discussed in further detail below with reference to FIGS. 7A and 7B, the system may expand the number of potential matching features by executed a max-correspondence routine. That is, a maximum correspondence approach is used to find correspondence between features in the query image and the catalog images, thus increasing the potential points that can verify the match between the probe and the catalog images.

At block 622, the system 100 identifies geometric inliers that are associated with each image. In some embodiments, the system may identify geometric inliers using a random sample consensus (RANSAC) algorithm. In some embodiments, the system 100 may employ an optimized RANSAC model (a Locally-Optimized RANSAC Algorithm) that utilizes an automated estimation of the number of iterations. The identified geometric inliers are further used to facilitate matching with the image. In particular, the use of geometric inliers in subsequent image matching results in filtering the number of ambiguous matching point pairs and reduction in the rate of false matches.

In block 624, the system 100 verifies and/or rejects image matches, based on, for example, unlikely distributions of the features matched. The system 100 may reject the image match if, for example, the features matched by the system 100 in block 620 are all found within a small region, all found on the same edge, and/or, in the case of images of people, none of the features are found on a skin region. The system 100 can verify the proposed matches by, for example, calculating a "semi-identity" transformation between the matched images, by using a variation of template matching, or by using a another matching technique.

In some embodiments, the system 100 determines that a query image is identical to a catalog image if the latter is obtained from the former by means of a semi-identity transformation. "Semi-identity" means that an image stays invariant under the transformation up to negligible variations that don't influence the main characteristics of the image's content. A semi-identity transformation is compared, on one hand, to identity transformation which leave images completely invariant and, on the other hand, to other transformations which lead to near-identical images with possibly high content variations. Examples of semi-identity transformations are a small crop of image margins, a slight blur which doesn't eliminate significant details, or compression which doesn't introduce noticeable image artifacts.

Figure 6B:
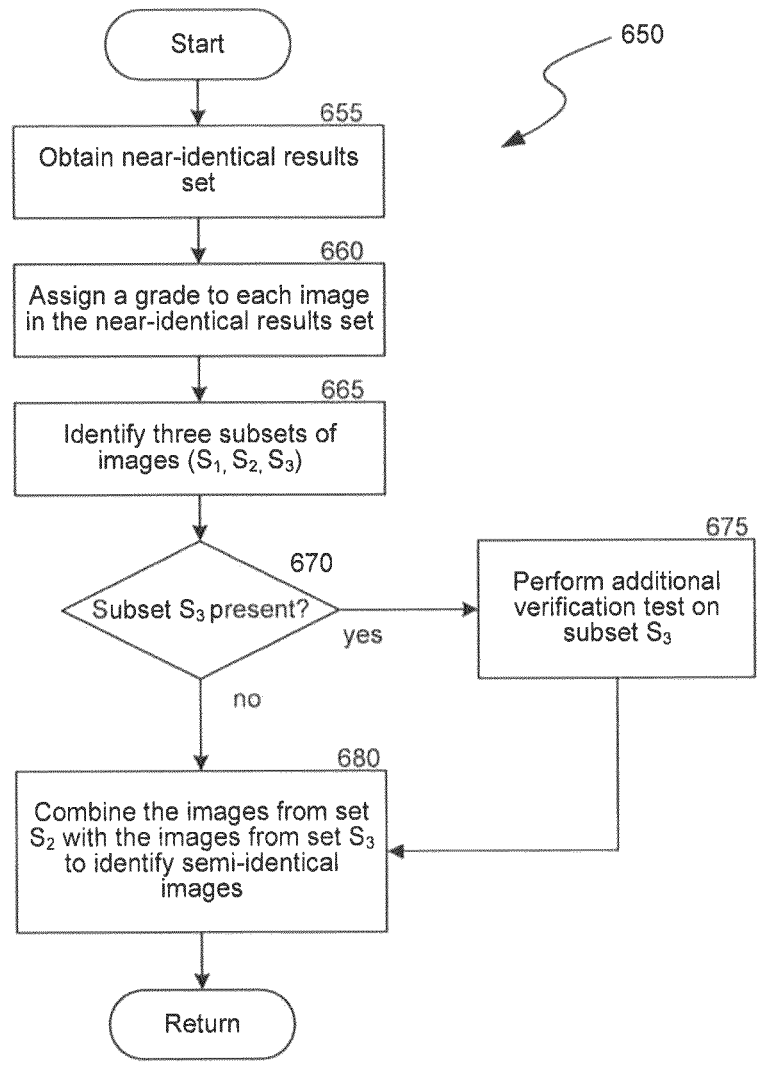
FIG. 6B is a flow chart of a process to identify semi-identical images.

Searching for semi-identical images may be viewed as a sub problem of searching for near-identical images, since search results of the former constitute a subset of search results of the latter. The system 100 therefore starts with near-identical search results in order to identify a semi-identical subset of images. FIG. 6B is a flow chart of a process 650 that is implemented by the system in order to identify semi-identical images. Initially, the system classifies near-identical search results according to a portion of geometrically valid matching point pairs called geometric inliers out of the total number probe feature points. To classify the near-identical feature points, at a block 655 the system 100 initially obtains a near-identical results set by running a query image against the near-identical search index. The search returns the near-identical results set $S=\{s_i\}, 0 \leq i \leq N_{results}$.

At a block 660, the system assigns a grade $G_i$ to each image in the near-identical results set S. The grade that is assigned by the system is equal to the number of geometric inliers $N_{inliers}$ of each image normalized by the number of probe feature points $N_{points}$, namely:

$$G_i = \frac{N_{inliers}}{N_{points}}$$

In some embodiments, the geometric matching is done by Locally Optimize RANSAC and the geometric inliers are previously-identified RANSAC inliers.

At a block 665, the system uses the grades $G_i$ to identify three subsets of images $S_1, S_2, S_3$ such that:

$S = \cup S_i$ and $S_1 = \{s_i : |G_i \leq T_1\}$ $S_2 = \{s_i : |G_i \geq T_2\}$ $S_3 = \{s_i : |T_1 < G_i < T_2\}$ Wherein the set $S_1$ contains results from the near-identical results set S that have too few geometric inliers and thus are considered to be far from being semi-identical, the set $S_2$ contains results from the near-identical results set S that have sufficient geometric inliers to be considered semi-identical with a desired level of confidence, and the set $S_3$ contains results from the near-identical results set S for which the number of geometric inliers doesn't permit a high confidence decision and requires an additional verification step. $T_1$ and $T_2$ are preset thresholds that are determined empirically by examining precision rates relative to desired outcomes.

At a decision block 670, the system determines whether the presence of the set $S_3$ dictates the performance of an additional semi-identity verification test. If no additional verification test is required, processing continues to a block 680. If an additional verification test is required, processing continues to a block 675. At block 675, the system 100 performs the following verification test for each image:

(1) The system warps the catalog image to the probe image's coordinates using a geometric transformation T identified during the near-identity search.

(2) The system resizes both the probe image and the catalog image to a constant size. Preferably, the size is equal to an integer power of 2 to allow an efficient Fast Fourier Transform.

(3) The system calculates a phase correlation PSR (Peak to Sidelobe Ratio) score which is invariant to constant illumination changes. To compute the PSR score, the system locates the phase correlation peak and computes the mean $\mu$ and the standard deviation $\sigma$ of a sidelobe region (excluding a central mask region) centered at the peak. The PSR score is defined as:

$$PSR = \frac{\text{Peak strength} - \mu}{\sigma}$$

(4) The system characterizes the image as being semi-identical when the PSR score is beyond a threshold $T_3$, i.e., the phase correlation results in a sufficiently large peak but small sidelobe, where the threshold $T_3$ is given by the following step function of probe-catalog area ratio:

$$T_3(r) = \begin{cases} a, & r \leq 0.5 \\ b, & 0.5 \leq r \leq 2 \\ a, & r \geq 2 \end{cases}$$

Where $$r = \frac{area(Probe)}{area(Catalog)}$$

and $b > a$

At a block 680, the system identifies the semi-identical images by combining the images from set $S_2$ with the images from set $S_3$ that passed the verification test performed by the system in block 675.

In further embodiments, the system 100 may instead utilize a variant of hamming distance. For example, the system 100 may sample a large number of points (e.g., 1000) in each image, find their geometric transformation using RANSAC, and verify whether their ratio in both images is the same. The use of a variant hamming distance verification process may be faster than existing methods and less sensitive to illumination and color changes.

In still another technique to determine whether matching regions are the same, the system 100 may use phase-correlation-based verification to compare images on a pixel level. Using phase-correlation, the system may determine if a first image A can be a translated version of a second image B. The use of a phase-correlation method may be calculated as follows. First, the system 100 can calculate an FFT of each sub image that is defined by the RANSAC region of interest. Based on the FFT of each sub image, the system 100 can calculate a cross-power spectrum R using the following equation (1):

$$R = \frac{FFT(imageA) * FFT(imageB)}{|FFT(imageA) * FFT(imageB)|} \quad (1)$$

In particular, the correlation is not performed on the whole image, but on the sub images defined by RANSAC regions of interest.

Because the cross-power spectrum R is generated based on RANSAC regions of interest, the disclosed technique is superior to prior techniques because it focuses on the region of the image match rather than the entire image. The peak location in the normalized cross-correlation R can define potential shift parameters (i.e. rotations and/or translations of similar images). In this way, the system 100 can identify query images that are rotated, cropped, and otherwise distorted versions of original catalog images.

Figure 7A:
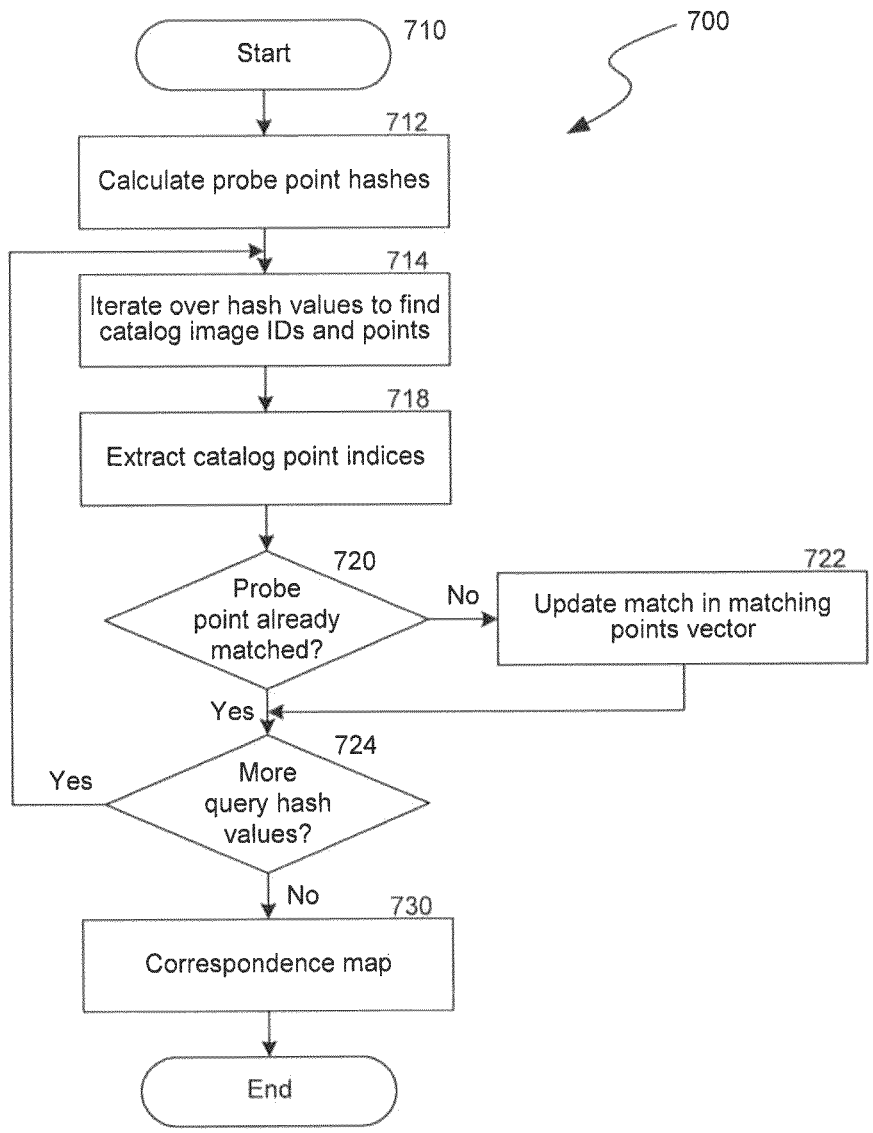
FIGS. 7A and 7B are block diagrams depicting image matching routines configured in accordance with one or more embodiments of the present disclosure.

FIG. 7A is a flow chart depicting an image matching routine 700 that is based on determining a maximum correspondence between images. The routine 700 at block 710 loads one or more query images to be analyzed for matching to one or more catalog images. The routine 700 at block 710 may also create a matching points vector (MPV). The MPV is configured to be a fixed sized vector representing correspondences between catalog image points and query image points for a specific catalog-image pair. For example, (q,c) may represent a specific query-catalog pair and $0 \leq i,j \leq N$ (e.g., N=256) may represent the indexes of catalog points. Correspondingly, if a query image's q point in a position i matches a catalog image's c point in a position j, then $MPV_{q,c}[i]=j$. Otherwise $MPV_{q,c}[i]=-1$. When the routine 700 creates the MPV, every value in the vector is set to −1. The routine 700 updates the MPV (in block 722 below) as catalog image matches are found.

In block 712, the routine 700 calculates query point hashes using, for example, a k-d tree. In some embodiments, each point in a query image may be assigned a hash h, while in other embodiments, each point in the query image may be assigned two or more hashes. Each query point hash represents a corresponding bucket in the k-d tree.

In block 714, the routine 700 iterates over the query image hash values calculated in block 712 to in order to find matching catalog image identifiers in the inverted catalog image index constructed in block 516 (FIG. 5). As noted above in reference to FIG. 5, the inverted catalog image index maps a particular hash to catalog image identifiers of catalog images containing descriptors represented by the particular hash. Accordingly, the routine 700 in block 714 determines which of the query image hashes are found in at least one of catalog images by matching the query image hashes to those found in the inverted catalog image index.

In block 718, the routine 700 iterates over the catalog image identifiers obtained in block 714. For each catalog image id, $C_k$, the routine 700 extracts the corresponding points indices $\{C_{k_i}\}_j$ residing in the bucket corresponding to the hash h in block 712. In other words, if a bucket of the catalog image index corresponds to the hash h, the points indices (1–N) of the particular corresponding catalog image are extracted by the routine 700.

In block 720, the routine 700 determines whether the query image point corresponding to the hash h has been matched. If the query image point has not been matched, the routine 700 updates the MPV in the block 722. If the query image point has been matched, the routine 700 determines whether there are more query image points to match. If there are, the routine 700 returns to block 714 to analyze an additional query image point. If there are no additional query image points to match, the routine 700 proceeds to block 730.

In block 730, the routine 700 constructs a correspondence map CM. As known to those skilled in the art, a correspondence map comprises a key value dictionary. The routine 700 constructs the correspondence map such that the keys are a predetermined number N catalog candidates for query Q with identifiers $\{[C]_k\}_{0<k\leq N}$ and the values are the corresponding Matching Points Vectors. If there are a predetermined number of matching points (e.g., 2 matching points) in the Matching Points Vector corresponding to each key, the routine 700 constructs a correspondence item with the query point number (catalog point X coordinate, catalog point Y coordinate) and inserts the correspondence item into a correspondence list. The images in the correspondence list may then be verified by, for example, the system 100 in block 624 as discussed above with reference to FIG. 6A.

Figure 7B:
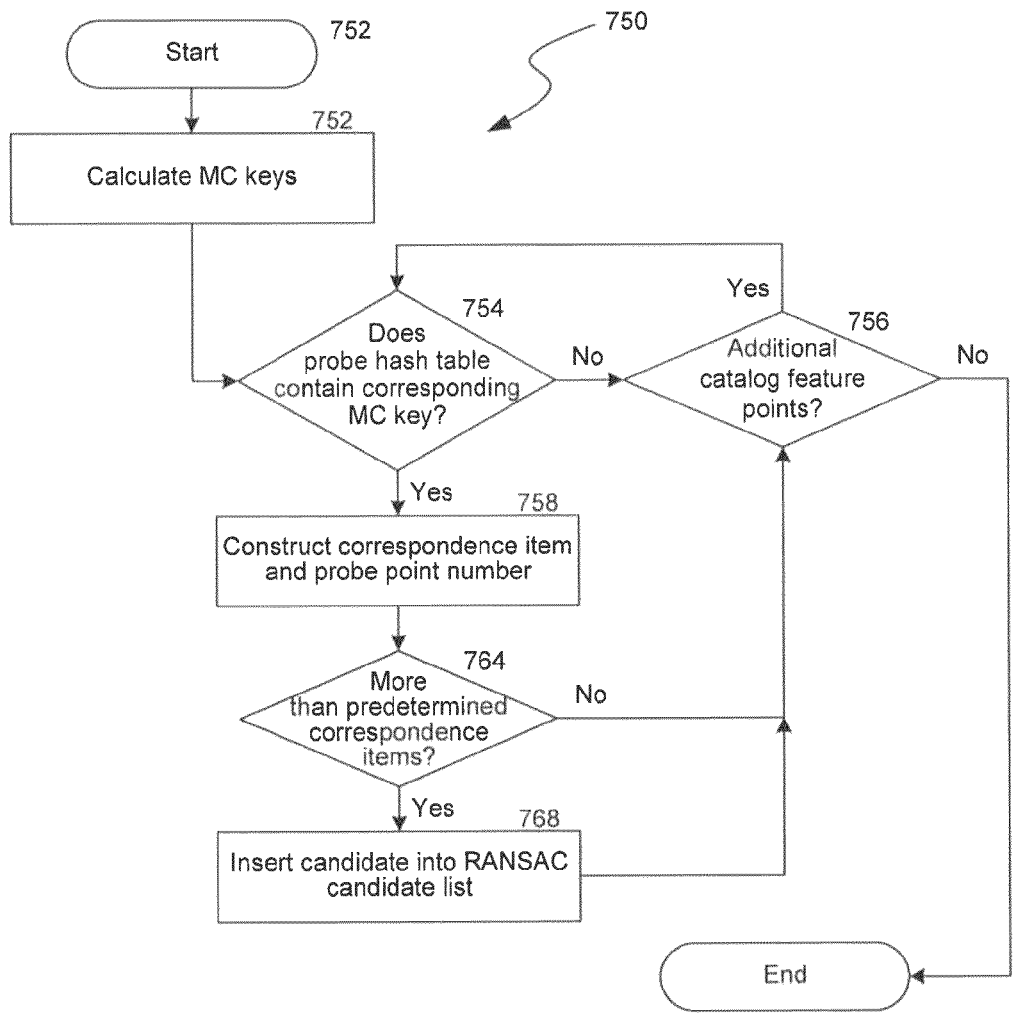

FIG. 7B is a block diagram depicting a maximum correspondence or image matching routine 750. The routine 750 matches query feature points to catalog feature points using maximum correspondence (MC) keys. The routine 750 assigns each catalog feature point a single MC key. In some embodiments of the routine 750, MC keys for catalog feature points may be calculated at block 752. In some embodiments, rather than be calculated in block 752, the catalog MC keys may be pre-calculated during image enrollment using, for example, using an MC tree and corresponding descriptors. The routine 750 also calculates MC keys for query image features at block 752 and creates a key-value probe hash table, in which the keys are MC keys and the values are corresponding point numbers (1–M). Each query point number can be chained at most N times into the hash table, each time with a different key (N is a user controllable constant).

In block 754, the routine 750 determines, for each catalog feature point, whether the probe hash table contains the corresponding MC key chain. If the probe hash table contains the corresponding MC key chain, the routine 750 proceeds to block 758 in which the correspondence item and probe point number corresponding to the catalog point X coordinate and catalog point Y coordinate, respectively are inserted to the correspondence list. If the probe has table does not contain the corresponding MC key chain, the routine 750 proceeds to block 756 to determine whether there are additional catalog feature points.

In decision block 764, the routine 750 determines whether the correspondence list contains a predetermined number (e.g., 3) of corresponding items. If the correspondence list contains the predetermined number of corresponding items, the routine 750 proceeds to block 768 in which the catalog candidate is inserted into a RANSAC candidate list. If the correspondence list does not contain the predetermined number of corresponding items, the routine 750 proceeds to block 756. At block 756, the routine 750 determines whether there are any additional catalog feature points to analyze. If yes, the routine 750 proceeds to block 754. If no, the routine 750 ends.

Editorial Index

Figure 8A:
FIG. 8A depicts representative images that are analyzed by an editorial module to remove unwanted background elements in the images prior to matching.

FIG. 8A depicts representative images that are analyzed by an editorial module to remove unwanted background elements in certain images prior to matching. As discussed above with reference to FIG. 1, the system 100 can comprise an editorial module 114 configured to remove, for example, logos, text, or other common background elements that may reduce verification effectiveness (collectively referred to in this Editorial Index section as "false attractors"). A significant cause of false matches during image matching is caused by false attractors on a background plane. The false attractors in a catalog image and a query image may match, but, apart from the false attractors match, the catalog image and query image may be completely different. In particular, such images often arise in the context of fashion, award presentations, sports, and other celebrity and glamor shots. FIG. 8 depicts two representative images 805, 810 from the People's Choice Awards® which have typical characteristics of editorial images. In particular, the images contain false attractors 815 in the background behind the actresses. The false attractors 815 may produce or bias two images towards a match even when there is no common content in the images except for the false attractors. In the images 805, 810, for example, even though the backgrounds are very similar the actresses in the images are different individuals.

To reduce the likelihood of false attractor-based matches, the editorial module 114 includes a support vector machine (SVM) or other machine learning algorithm that is trained to detect logos, text, common textures and other background elements sometimes found in editorial images. Training data is used to train the support vector machine. The training data is divided into two groups—images containing regions matched on false attractors and images containing regions matched on foreground objects. The editorial module 114 calculates statistics about images in each of the groups based on matching region dimensions, gray level values distribution moments, and the distribution of gradient magnitudes in the images. Using the calculated statistics, the SVM is then trained so that it is capable of classifying identified matching regions in an image as either "false attractor" or "not false attractor" classes. Those matching regions characterized as "not false attractor" are used when matching images, whereas those matching regions characterized as "false attractors" are ignored or discarded. In this way, the editorial module 114 may exclude matches caused by false attractors from the matching results.

Figure 8B:
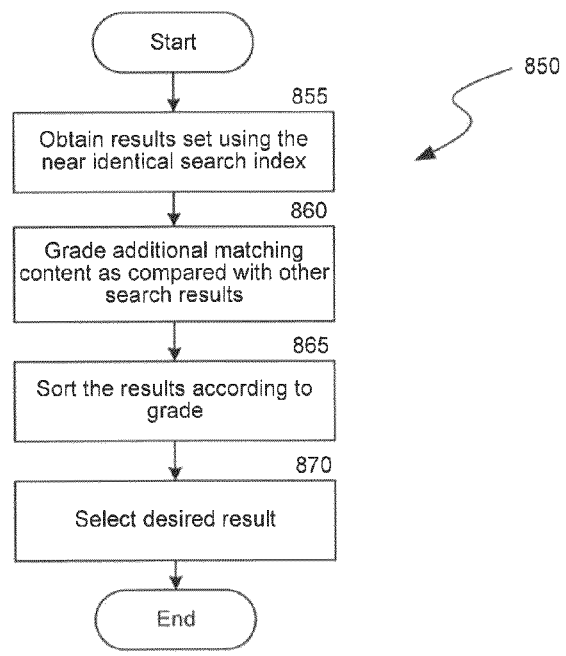
FIG. 8B is a flow chart of a process implemented by the editorial module to improve on near-identical search results for editorial images.

In addition to the problem of background false attractors, the small variations that are typical in editorial images—such as slight variations in poses, body and facial gestures, and shot angles—pose difficulties to the use of the previously-described near-identical index to generate accurate matches. In order to overcome the shortcomings of the near-identical index when used with editorial images, the editorial module 114 performs an additional verification process to improve the likelihood of identifying desired matches. FIG. 8B is a flow chart of a process 850 implemented by the editorial module 114 to improve on near-identical search results for editorial images. At a block 855, the editorial module 114 obtains an initial results set of images using the near-identical search index as supplemented by application of the SVM to discard those matching regions in images that are characterized as "false attractors" (as described above). At a block 860, the editorial module 114 assigns a grade $G_i$ to each result in the results set, where the grade is equal to the number of principle features in the image that were geometrically matched to points in the probe in a bijective way. That is, there are no other points in other near-identical results that matched to the corresponding point in the probe. Such matching point pairs are called catalog bijective geometric inliers, and may be expressed as follows:

$$T_i(p\text{probe}) = p\text{result}_i \text{ and } T_j(p\text{probe}) = p\text{result}_j \text{ IFF } i = j$$

In some embodiments, the geometric matching is done by Locally Optimized RANSAC and the geometrically valid matched points are RANSAC inliers.

At a block 865, the editorial module sorts the results based on the assigned grade. The higher the grade that is assigned by the editorial module 114, the more distinctive the search result is relative to the others and the stronger the match. Conversely, the lower the grade assigned by the editorial module, the less distinctive the search result is relative to the others and the weaker the match. After sorting the search results, at a block 870 the editorial module selects a desired image. Typically, the image with the highest grade is selected for presentation. Alternatively, a small number of results may be presented to a system operator for manual review.

The Anti-Catalog

Query and catalog images may also be matched because of undesirable objects that are frequently observed in images, but are not interesting for users searching for particular images because they seek images with primary elements other than those objects. Examples of undesirable objects that a user may seek to avoid include different logos in the background, well-known objects on the background (e.g. the Eiffel tower), movie or games posters on the background, text on the image, common textures and geometric shapes etc. In order to avoid matching on images containing undesirable objects, the system 100 utilizes an index that is built using a catalog of images of undesirable objects ("an anti-catalog"). For example, an anti-catalog may comprise movies posters, logos, images of the moon, the Earth, and/or other objects not of interest to typical searchers. As was previously described with respect to FIG. 2A, as part of post-processing of an image before adding the image characterization to the catalog, the anti-catalog module 218 may remove unwanted elements in the characterization of the image. The query and catalog images may be filtered, for example, after enrollment using the following procedure:

1. Search the enrolled images in the anti-catalog index.
2. Remove points from the catalog image data that caused matches in the anti-catalog index.

3. Replace the original enrollment data associated with each catalog image with the cleaned enrollment data reflecting a decremented point value.

By removing principle features from catalog images containing the undesirable objects found in the anti-catalog, the catalog images are less likely to be found as a result of a query search. Representative images having unwanted elements (from a search perspective) are depicted in FIG. 10. An image 1010 and an image 1050 each contain a prominent background element (i.e., an American flag) and a speaker in the foreground. A typical image matching system may match the images 1010 and 1050 because each contain an American flag and the flag is a significant portion of the image. However, the foreground content (i.e., the speaker) is likely of more interest than the American flag and a user searching for images similar to the image 1010 may not be particularly interested in the image 1050, and vice versa. The anti-catalog filtering described herein will therefore remove principal features from the image characterization prior to adding the image to the catalog. For purposes of explanation, images 1020 and 1060 show the effect of removing principle features that characterize the background and primarily keeping principle features that characterize the remaining portion of the images. The differences between the foreground content of the images immediately becomes apparent, and attempting to match a query image to characterizations of images 1020 and 1060 becomes significantly easier and more accurate since only the principal features associated with the foreground portions have been retained. It will be appreciated that the images 1010 and 1050 are stored in their entirety, and that images 1010 and 1050 are merely used for purposes of explanation and are not retained by the system.

Figure 11:
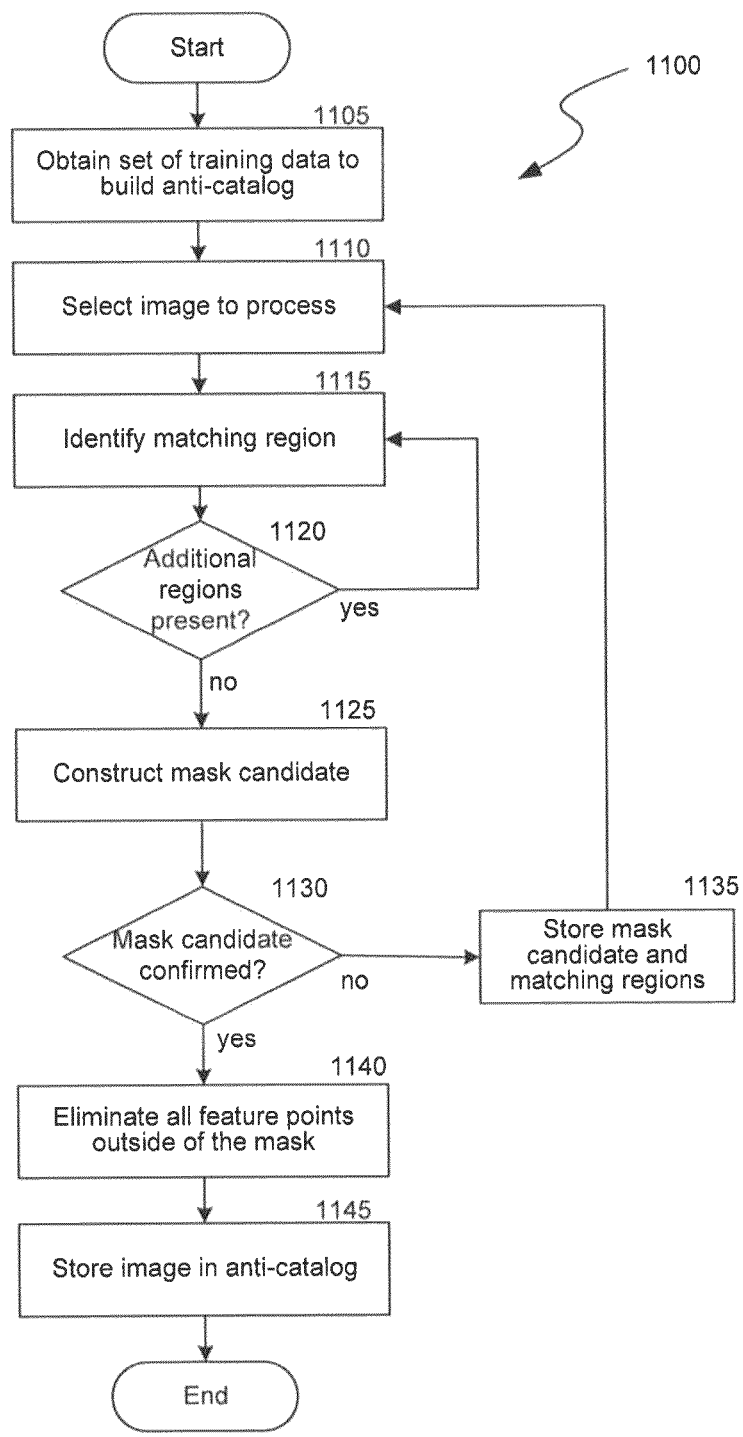
FIG. 11 is a flow diagram of an automated technique that is used by the system to build an anti-catalog.

FIG. 11 is a flow diagram of an automated technique 1100 that is used by the system to build an anti-catalog. At a block 1105, the system 100 obtains a set of training data on which to build the anti-catalog. The training data may be probes (based on query images) and corresponding catalog images that were improperly matched during a search process due to the existence of unwanted background objects. At a block 1110, the system selects one of the catalog images for analysis. At blocks 1115-1120, the system analyzes the catalog image to identify all of the regions in the image that were matched by the probes. That is, at a block 1115, the system identifies a first region within the catalog image that matched a probe. At a decision block 1120, the system determines whether any other matching regions exist in the catalog image. If other matching regions exist, processing continues to block 1115 where the system identifies a second (and subsequent) matching region within the catalog image. If, however, no additional matching regions exist at block 1120, processing continues to block 1125.

At block 1125, the system constructs a mask for the candidate image. The mask is intended to encompass only those areas of the image that include unwanted objects, and to exclude those areas of the image that contain features of interest. To construct the mask, the system 100 builds a minimal continuous rectangular envelope which encloses all matching regions in the catalog image that were identified in blocks 1115-1120. In other words, the rectangular envelope encompasses those areas of the catalog image that are matched by the probes. The rectangular envelope that includes all of the matching regions in the candidate image is characterized as a candidate mask, since further verification of its accuracy may be sought before adding the image to the anti-catalog.

At a decision block 1130, the system determines whether there is sufficient evidence to support adding the masked portion of the image to the anti-catalog. Evidence of support may be found by a manual review of the mask and catalog image to confirm its accuracy. Alternatively or additionally, evidence of support may be found by determining whether a threshold number of other probes have each separately identified the matching regions in the mask. For example, the system may require that a certain number (e.g., five) probes match a particular matching region in a catalog image before deeming it sufficient evidence to add the masked portion of the catalog image to the anti-catalog. If sufficient evidence of support is not identified by the system at block 1130, processing proceeds to block 1135 where the system stores the candidate mask (and the matching regions). The stored candidate mask can be referenced to provide support for the potential addition of the catalog image to the anti-catalog in the future. If, however, sufficient evidence exists at block 1130 to support adding the mask candidate to the anti-catalog, processing continues to block 1140.

At block 1140, the system eliminates all feature points in the catalog image that are outside of the mask. That is, since the image is to be added to the anti-catalog, the system only retains those feature points in the image that have been identified as unwanted or objectionable. Feature points of value in the image are removed so that they don't become part of the anti-catalog. At a block 1145, the modified characterization of the image is added to the anti-catalog. In this fashion, the anti-catalog is automatically populated with images that only contain unwanted or objectionable features.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A method in a computing system for matching a query image against a catalog of images to identify semi-identical images, the method comprising:
maintaining a catalog of images, each image in the catalog of images characterized by vectors associated with principle feature points of the image, the catalog of images being further processed to remove certain principle feature points associated with one or more images;
maintaining an inverted index to the catalog of images, the inverted index comprised of hash values of the vectors associated with each image;
receiving a query image that is to be searched against the catalog of images;
characterizing the received query image by:
extracting principal feature points from the query image;
creating vectors characterizing the extracted principal feature points; and
generating hash values for each of the vectors characterizing the query image; and
searching the catalog of images to find semi-identical images to the query image by:
comparing the query image hash values with the inverted index to the catalog of images;
identifying a set of catalog images having a predetermined number of hash values in common with the query image hash values;
identifying a number of geometric inliers in each image in the identified set of catalog images; and
identifying, from the set of catalog images, a set of near-identical images based on images that have a total number of geometric inliers that exceed a threshold value.

2. The method of claim 1, wherein the hash value of vectors are calculated using a k-d tree.

3. The method of claim 2, wherein the k-d tree has a predetermined number of vectors.

4. The method of claim 1, wherein the number of hash values characterizing a catalog image is less than the number of hash values characterizing the query image.

5. The method of claim 1, wherein the set of near-identical images is further based on normalizing the total number of geometric inliers for an image by the number of hash values characterizing the image.

6. The method of claim 1, wherein the geometric inliers are identified by a random sample consensus (RANSAC) algorithm.

7. The method of claim 1, wherein processing the catalog of images is performed using a support vector machine (SVM).

8. The method of claim 1, wherein the certain principle feature points removed by processing the catalog of images is based on a comparison with a catalog of unwanted features to remove unwanted features from an image.

9. A non-transitory computer-readable medium containing instructions that, when executed on a processor, cause the processor to implement a method for matching a query image against a catalog of images to identify semi-identical images, the method comprising:
maintaining a catalog of images, each image in the catalog of images characterized by vectors associated with principle feature points of the image, the catalog of images being further processed by removing certain principle feature points associated with one or more images;
maintaining an inverted index to the catalog of images, the inverted index comprised of hash values of the vectors associated with each image;
receiving a query image that is to be searched against the catalog of images;
characterizing the received query image by:
extracting principal feature points from the query image;
creating vectors characterizing the extracted principal feature points; and
generating hash values for each of the vectors characterizing the query image; and
searching the catalog of images to find semi-identical images to the query image by:
comparing the query image hash values with the inverted index to the catalog of images;
identifying a set of catalog images having a predetermined number of hash values in common with the query image hash values;
identifying a number of geometric inliers in each image in the identified set of catalog images; and
identifying, from the set of catalog images, a set of near-identical images based on images that have a total number of geometric inliers that exceed a threshold value.

10. The non-transitory computer-readable medium of claim 9, wherein the number of hash values characterizing a catalog image is less than the number of hash values characterizing the query image.

11. The non-transitory computer-readable medium of claim 9, wherein the set of near-identical images is further based on normalizing the total number of geometric inliers for an image by the number of hash values characterizing the image.

12. The non-transitory computer-readable medium of claim 9, wherein the geometric inliers are identified by a random sample consensus (RANSAC) algorithm.

13. The non-transitory computer-readable medium of claim 9, wherein processing the catalog of images is performed using a support vector machine (SVM).

14. The non-transitory computer-readable medium of claim 9, wherein the certain principle feature points removed by processing the catalog of images is based on a comparison with a catalog of unwanted features to remove unwanted features from an image.

* * * * *